（12） United States Patent
Kumar et al.

(10) Patent No.: US 10,380,647 B2
(45) Date of Patent: Aug. 13, 2019

(54) SELECTION AND/OR MODIFICATION OF A PORTION OF ONLINE CONTENT BASED ON AN EMOTIONAL STATE OF A USER (71) Applicant: Excalibur IP, LLC, New York, NY (US)

(72) Inventors: Varun Kumar, Adityapur (IN); Srinivas Reddy Punur, Bangalore (IN)

(73) Assignee: Excalibur IP, LLC, Sunnyvale, CA (US)

( * ) Notice: Subject to any disclaimer, the term of this patent is extended or adjusted under 35 U.S.C. 154(b) by 224 days.

(21) Appl. No.: 15/337,001

(22) Filed: Oct. 28, 2016

(65) Prior Publication Data
US 2017/0046746 A1 Feb. 16, 2017

Related U.S. Application Data (63) Continuation of application No. 12/973,329, filed on Dec. 20, 2010, now Pat. No. 9,514,481.

(51) Int. Cl.
*G06Q 30/02* (2012.01)
*G06Q 30/00* (2012.01)

(52) U.S. Cl.
CPC ..... *G06Q 30/0269* (2013.01); *G06Q 30/0255* (2013.01)

(58) Field of Classification Search
None
See application file for complete search history.

(56) References Cited

U.S. PATENT DOCUMENTS

| | | | |
|---|---|---|---|
| 6,292,688 B1 * | 9/2001 | Patton | A61B 5/04842 600/300 |
| 8,401,248 B1 * | 3/2013 | Moon | G06Q 30/0242 382/103 |
| 8,487,772 B1 * | 7/2013 | Higgins | G06Q 30/0201 340/573.1 |
| 8,683,348 B1 * | 3/2014 | Blank | G06F 3/011 715/709 |
| 9,514,481 B2 * | 12/2016 | Kumar | G06Q 30/0269 |
| 2003/0032890 A1 * | 2/2003 | Hazlett | A61B 5/0488 600/546 |
| 2003/0118974 A1 * | 6/2003 | Obrador | G09B 23/28 434/236 |
| 2004/0199923 A1 * | 10/2004 | Russek | G06Q 30/00 719/310 |
| 2004/0204983 A1 * | 10/2004 | Shen | G06Q 10/10 705/14.43 |

(Continued)

*Primary Examiner* — Matthew T Sittner
(74) *Attorney, Agent, or Firm* — Brinks Gilson & Lione (57) ABSTRACT Techniques are described herein for, among other things, selecting and/or modifying a portion of online content based on an emotional state of a user. The user's emotional state is determined based on the user's online activity. A portion or portions of online content are selected and/or modified for provision to the user based on the user's emotional state. A portion of online content may be modified in any of a variety of ways. For example, a color that is included in a portion of online content may be replaced with a different color. In another example, a color filter may be applied to the portion of online content. In yet another example, visual attribute(s) of the portion of online content may be modified. Examples of a visual attribute include, but are not limited to, hue, brightness, contrast, and saturation.

14 Claims, 6 Drawing Sheets

(56) References Cited

U.S. PATENT DOCUMENTS

| | | | | |
|---|---|---|---|---|
| 2004/0243529 | A1* | 12/2004 | Stoneman | G06N 20/00 706/10 |
| 2004/0243592 | A1* | 12/2004 | Bill | G06F 16/40 |
| 2006/0195328 | A1* | 8/2006 | Abraham | G06Q 20/204 235/382 |
| 2006/0288362 | A1* | 12/2006 | Pulton, Jr. | H04N 7/165 725/34 |
| 2007/0033050 | A1* | 2/2007 | Asano | G10L 17/26 704/270 |
| 2007/0223871 | A1* | 9/2007 | Thelen | G11B 27/034 386/280 |
| 2007/0233622 | A1* | 10/2007 | Willcock | G06Q 30/0203 706/16 |
| 2007/0294273 | A1* | 12/2007 | Bendeck | G06F 16/68 |
| 2008/0082613 | A1* | 4/2008 | Szeto | G06Q 10/107 709/206 |
| 2008/0141138 | A1* | 6/2008 | Kalaboukis | G06Q 10/107 715/741 |
| 2008/0320037 | A1* | 12/2008 | MacGuire | G06F 16/986 |
| 2009/0088877 | A1* | 4/2009 | Terauchi | G10H 1/0025 700/94 |
| 2009/0094629 | A1* | 4/2009 | Lee | G06Q 30/02 725/10 |
| 2009/0133047 | A1* | 5/2009 | Lee | A61B 5/0205 725/10 |
| 2009/0133064 | A1* | 5/2009 | Maruyama | H04N 7/163 725/40 |
| 2009/0144071 | A1* | 6/2009 | Saito | G06Q 30/02 705/346 |
| 2009/0150919 | A1* | 6/2009 | Lee | H04N 7/17309 725/10 |
| 2009/0157609 | A1* | 6/2009 | Phan | G06F 16/972 |
| 2009/0195392 | A1* | 8/2009 | Zalewski | G06F 3/012 340/573.1 |
| 2009/0234718 | A1* | 9/2009 | Green | G06Q 30/0203 705/7.32 |
| 2010/0036720 | A1* | 2/2010 | Jain | G06Q 30/02 705/14.13 |
| 2010/0039618 | A1* | 2/2010 | De Lemos | A61B 3/113 351/209 |
| 2010/0107075 | A1* | 4/2010 | Hawthorne | G06Q 10/06 715/708 |
| 2010/0249538 | A1* | 9/2010 | Pradeep | A61B 5/16 600/301 |
| 2010/0255812 | A1* | 10/2010 | Nanjundaiah | H04M 3/42017 455/411 |
| 2011/0154197 | A1* | 6/2011 | Hawthorne | G06Q 30/02 715/704 |
| 2012/0030368 | A1* | 2/2012 | John | G06F 17/214 709/231 |
| 2012/0072939 | A1* | 3/2012 | Crenshaw | H04H 60/33 725/12 |
| 2012/0095976 | A1* | 4/2012 | Hebenthal | G06F 16/9535 707/706 |
| 2012/0130819 | A1* | 5/2012 | Willcock | G06Q 30/02 705/14.66 |
| 2012/0143693 | A1* | 6/2012 | Chung | G06Q 30/0269 705/14.66 |
| 2012/0158504 | A1* | 6/2012 | Kumar | G06Q 30/0255 705/14.53 |
| 2017/0046746 | A1* | 2/2017 | Kumar | G06Q 30/0255 |

* cited by examiner

SELECTION AND/OR MODIFICATION OF A PORTION OF ONLINE CONTENT BASED ON AN EMOTIONAL STATE OF A USER

RELATED APPLICATIONS

The present application is a continuation of U.S. patent application Ser. No. 12/973,329 (still pending), filed on Dec. 20, 2010, the entire disclosure of which is hereby incorporated by reference.

BACKGROUND OF THE INVENTION

Field of the Invention

The present invention relates to online advertising.

Background

Certain advertisement ("ad") networks enable ads (e.g., contextual ads, sponsored ads, display ads, etc.) to be served to users who visit the Web sites of publishers that are participating in the ad network. Advertisers generate the ads and buy placements (a.k.a. inventory) for those ads on the publishers' Web sites usually based on the anticipated audiences for those sites and/or the content of those sites. A placement represents a publisher's agreement to serve a trafficked (i.e., specified) ad to users when the users visit the publisher's site. The publisher often serves the trafficked ad contemporaneously with other content that is associated with the publisher's site. For instance, sponsored search advertising systems commonly serve sponsored ads (e.g., sponsored search results) to users who enter queries on search engine websites, often alongside algorithmic search results that are provided in response to those queries.

Ad networks typically include ad serving systems that determine which advertisements are to be provided to users. In conventional ad networks, when a publisher receives a page view or a search query from a user, the publisher sends an ad call to an ad serving system. An ad call is a request for an advertisement. The ad serving system selects an advertisement from an ad inventory based on various factors, such as the geographic and/or demographic information regarding the user. The ad serving system then sends the advertisement to the publisher, so that the publisher can serve the advertisement to the user.

Advertisers typically wish to attract users to their advertisements. To that end, advertisers are more commonly incorporating features into their advertisements that are intended to grab the attention of the users to whom the advertisements are served. For example, such advertisements may include features that move, flash on and off, change appearance, etc. Moreover, the advertisements may play sounds, challenge users to play a game, etc. However, such features may have an unintended effect of annoying the users, which may decrease the likelihood that the users will be attracted to the advertisements.

BRIEF SUMMARY OF THE INVENTION

Various approaches are described herein for, among other things, selecting and/or modifying an ad based on an emotional state of a user. The user's emotional state is determined based on the user's online activity. Examples of online activity include, but are not limited to, consumption of online content such as blog text, an online video, online music, etc. by the user; entry of information such as text (e.g., keywords), an emoticon, an image, a video, etc. by the user in an email message, a social networking update, a blog post, a Web page, a cloud application (e.g., an online calendar), etc.; and any other suitable type of online activity, whether current or historical. Advertisement(s) are selected and/or modified for provision to the user based on the user's emotional state. An advertisement may be modified in any of a variety of ways. For example, a color that is included in an advertisement may be replaced with a different color. In another example, a color filter may be applied to the advertisement. In yet another example, visual attribute(s) of the advertisement may be modified. Examples of a visual attribute include, but are not limited to, hue, brightness, contrast, and saturation.

An example method is described in which an emotional state of a user is determined from among specified emotional states based on online activity of the user. At least one advertisement is selected to be provided to the user from among multiple advertisements based on the emotional state of the user.

Another example method is described in which advertisement(s) are selected that satisfy designated criteria. An emotional state of the user is determined from among specified emotional states based on online activity of the user. One or more visual properties of the advertisement(s) are modified based on the emotional state of the user to provide respective modified advertisement(s) that are to be provided to the user.

An example system is described that includes a determination module and a selection module. The determination module is configured to determine an emotional state of a user from among specified emotional states based on online activity of the user. The selection module is configured to select advertisement(s) to be provided to the user from among multiple advertisements based on the emotional state of the user.

Another example system is described that includes an ad targeting module, a determination module, and a modification module. The ad targeting module is configured to select advertisement(s) that satisfy designated criteria. The determination module is configured to determine an emotional state of the user from among specified emotional states based on online activity of the user. The modification module is configured to modify one or more visual properties of the advertisement(s) based on the emotional state of the user to provide respective modified advertisement(s) that are to be provided to the user.

Further features and advantages of the disclosed technologies, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Example embodiments are capable of selecting and/or modifying an advertisement ("ad") based on an emotional state of a user. The user's emotional state is determined based on the user's online activity. Examples of online activity include, but are not limited to, consumption of online content such as blog text, an online video, online music, etc. by the user; entry of information such as text (e.g., keywords), an emoticon, an image, a video, etc. by the user in an email message, a social networking update, a blog post, a Web page, a cloud application (e.g., an online calendar), etc.; and any other suitable type of online activity, whether current or historical. Advertisement(s) are selected and/or modified for provision to the user based on the user's emotional state. An advertisement may be modified in any of a variety of ways. For example, a color that is included in an advertisement may be replaced with a different color. In another example, a color filter may be applied to the advertisement. In yet another example, visual attribute(s) of the advertisement may be modified. Examples of a visual attribute include, but are not limited to, hue, brightness, contrast, and saturation.

Techniques described herein have a variety of benefits as compared to conventional techniques for selecting an advertisement to be provided to a user. For example, by selecting and/or modifying an ad based on the user's emotional state, the ad may be more likely to appeal to the user. The techniques may remove ads that the user is likely to reject or dismiss. Furthermore, the techniques may result in greater user interactivity with delivered ads, which may achieve wider and/or more effective distribution of an advertiser's message.

II. Example Embodiments

Figure 1:
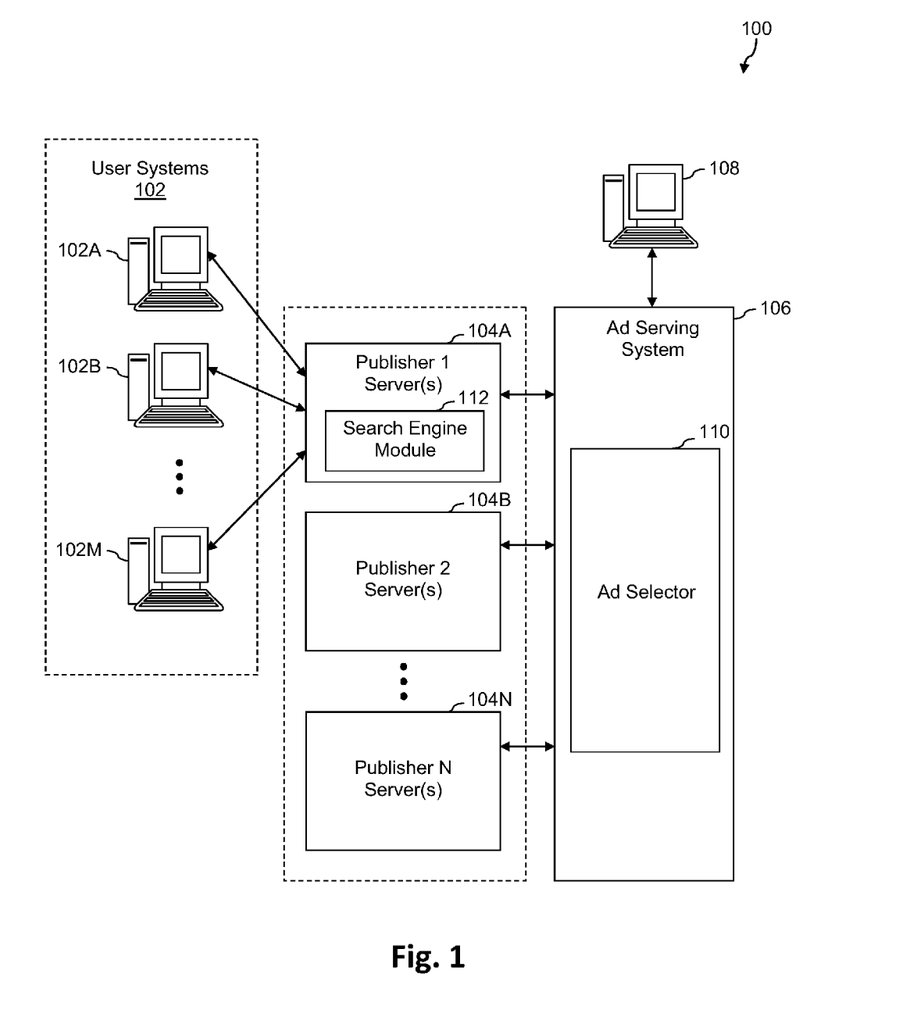
FIG. 1 is a block diagram of an example advertisement network according to an embodiment described herein.

FIG. 1 is a block diagram of an example advertisement ("ad") network in accordance with an embodiment described herein. Generally speaking, ad network 100 operates to serve ads (e.g., contextual ads, sponsored ads, display ads, etc.) provided by advertisers to sites (e.g., Web sites) published by publishers when such sites are accessed by certain users of the network, thereby delivering the ads to the users. As shown in FIG. 1, ad network 100 includes a plurality of user systems 102A-102M, a plurality of publisher servers 104A-104N, an ad serving system 106, and at least one advertiser system 108. Communication among user systems 102A-102M, publisher servers 104A-104N, ad serving system 106, and advertiser system 108 is carried out over a network using well-known network communication protocols. The network may be a wide-area network (e.g., the Internet), a local area network (LAN), another type of network, or a combination thereof.

User systems 102A-102M are computers or other processing systems, each including one or more processors, that are capable of communicating with any one or more of publisher servers 104A-104N. For example, each of user systems 102A-102M may include a client that enables a user who owns (or otherwise has access to) the user system to access sites (e.g., Web sites) that are hosted by publisher servers 104A-104N. For instance, a client may be a Web crawler, a Web browser, a non-Web-enabled client, or any other suitable type of client. By way of example, each of user systems 102A-102M is shown in FIG. 1 to be communicatively coupled to publisher 1 server(s) 104A for the purpose of accessing a site published by publisher 1. Persons skilled in the relevant art(s) will recognize that each of user systems 102A-102M is capable of connecting to any of publisher servers 104A-104N for accessing the sites hosted thereon.

Publisher servers 104A-104N are computers or other processing systems, each including one or more processors, that are capable of communicating with user systems 102A-102M. Each of publisher servers 104A-104N is configured to host a site (e.g., a Web site) published by a corresponding publisher 1-N so that such site is accessible to users of network 100 via user systems 102A-102M. Each of publisher servers 104A-104N is further configured to serve advertisements (e.g., contextual ads, sponsored ads, display ads, etc.) to users of network 100 when those users access a Web site that is hosted by the respective publisher server.

Publisher servers 104A-104N are further configured to execute software programs that provide information to users in response to receiving requests, such as hypertext transfer protocol (HTTP) requests, from users, instant messaging (IM) applications, or web-based email. For example, the information may include Web pages, images, other types of files, output of executables residing on the publisher servers, IM chat sessions, emails, etc. In accordance with this example, the software programs that are executing on publisher servers 104A-104N may provide Web pages that include interface elements (e.g., buttons, hyperlinks, etc.)

that a user may select for accessing the other types of information. The Web pages may be provided as hypertext markup language (HTML) documents and objects (e.g., files) that are linked therein, for example.

One type of software program that may be executed by any one or more of publisher servers 104A-104N is a Web search engine. For instance, publisher 1 server(s) 104A is shown to include search engine module 112, which is configured to execute a Web search engine. Search engine module 112 is capable of searching for information on the World Wide Web (WWW) based on queries that are provided by users. For example, search engine module 112 may search among publisher servers 104A-104N for requested information. Upon discovering instances of information that are relevant to a user's query, search engine module 112 ranks the instances based on their relevance to the query. Search engine module 112 provides a list that includes each of the instances in an order that is based on the respective rankings of the instances. The list may be referred to as the search results corresponding to the query.

Search engine module 112 is configured to provide an ad call to ad serving system 106, upon receiving a query from a user, to request an advertisement (e.g., a contextual ad, a sponsored ad, a display ad, etc.) to be provided to the user. Search engine module 112 forwards a user identifier that corresponds to (e.g., that specifies) the user to ad serving system 106. For example, the user identifier may include a browser cookie of the user or information that is included in the browser cookie. In another example, the user identifier may include a username that is associated with the user. Search engine module 112 may incorporate the user identifier in the ad call or may provide the user identifier in addition to the ad call.

It will be recognized that a search engine module (e.g., search engine module 112) need not necessarily be included in publisher server(s) in order for the publisher server(s) to provide an ad call to ad serving system 1016. For instance, any one or more of publisher servers 104A-104N may provide an ad call to ad serving system 106 without utilizing a search engine module.

Ad serving system 106 is a computer or other processing system, including one or more processors, that is capable of serving advertisements (e.g., contextual ads, sponsored ads, display ads, etc.) that are received from advertiser system 108 to each of publisher servers 104A-104N when the sites hosted by such servers are accessed by certain users, thereby facilitating the delivery of such advertisements to the users. For instance, ad serving system 106 may serve advertisement(s) to a publisher server 104 in response to an ad call that is received from that publisher server 104. The ad call may be initiated in response to a query that is provided by a user. Ad serving system 106 may select an appropriate advertisement to be provided to the user based on a user identifier that is received from search engine module 112.

Ad serving system 106 includes an ad selector 110. Ad selector 110 is configured to select and/or modify an advertisement (e.g., a contextual ad, a sponsored ad, a display ad, etc.) based on an emotional state of a user. Ad selector 110 receives an ad call from a publisher server 104. The ad call requests an advertisement to be displayed to a user. Ad selector 110 receives a user identifier that corresponds to the user from the publisher server 104. The user identifier may be included in the ad call or may be received in addition to the ad call.

Ad selector 110 may use the user identifier to determine the emotional state of the user in any of a variety of ways. For example, ad selector 110 may access a look-up table and compare the user identifier with information (e.g., metadata) stored in the look-up table that is associated with online activity of the user. In accordance with this example, each instance of online activity may be associated with a respective specified emotion. Ad selector 110 may aggregate the specified emotions to determine the emotional state of the user. In further accordance with this example, each of the emotions may be associated with a respective weight based on an amount of time that has lapsed since occurrence of the corresponding instance of online activity.

In some example embodiments, ad selector 110 selects one or more advertisements to be provided to the user based on the emotional state of the user. In other example embodiments, ad selector 110 modifies one or more selected advertisements based on the emotional state of the user before providing the selected advertisements to the user. In accordance with this example embodiment, ad selector 110 may change color(s) that are included in the one or more advertisements, apply a color filter to the one or more advertisements, modify visual attribute(s) such as hue, brightness, contrast, and/or saturation of the one or more advertisements, etc. Techniques for selecting and/or modifying an advertisement based on an emotional state of a user are described in further detail below with reference to FIGS. 2-5.

Advertiser system 108 is a computer or other processing system, including one or more processors, that is capable of providing advertisements (e.g., contextual ads, sponsored ads, display ads, etc.) to ad serving system 106, so that the advertisements may be served to publisher servers 104A-104N when the sites hosted by the respective servers are accessed by certain users. Although one advertiser system 108 is depicted in FIG. 1, persons skilled in the relevant art(s) will recognize that any number of advertiser systems may be communicatively coupled to ad serving system 106.

Although advertiser system 108 and user systems 102A-102M are depicted as desktop computers in FIG. 1, persons skilled in the relevant art(s) will appreciate that advertiser system 108 and user systems 102A-102M may include any browser-enabled system or device, including but not limited to a laptop computer, a tablet computer, a personal digital assistant, a cellular telephone, or the like.

Figure 2:
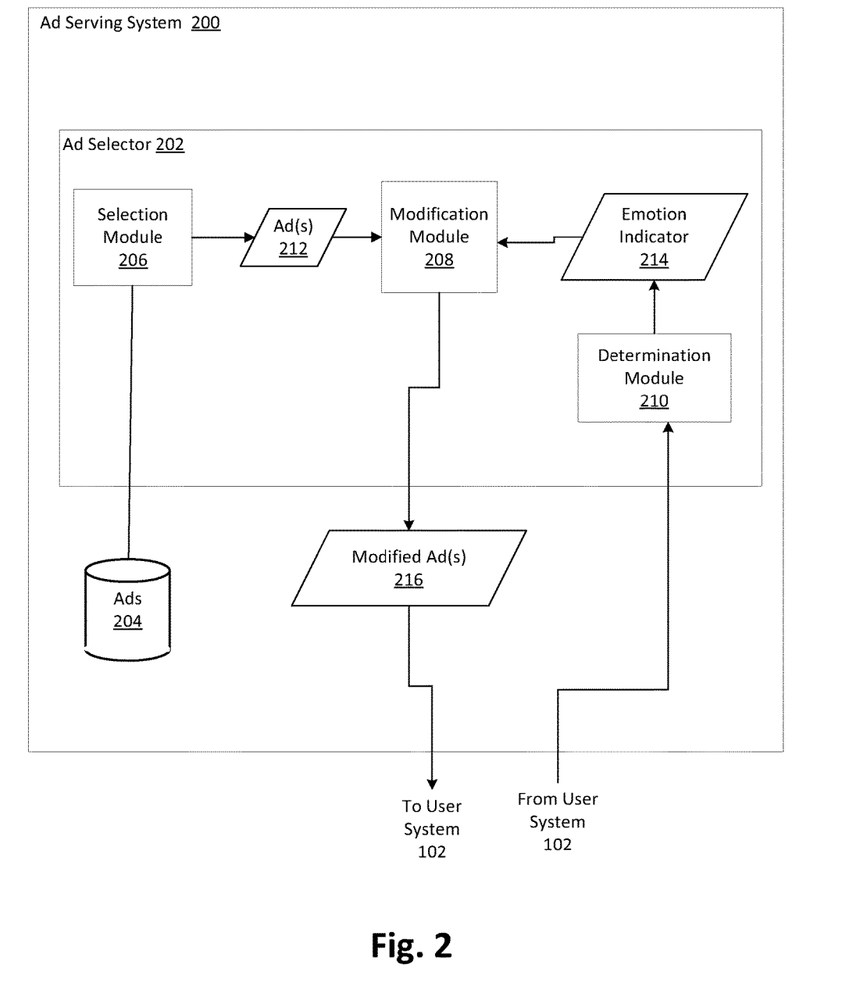
FIGS. 2 and 3 are block diagrams of example implementations of an ad serving system shown in FIG. 1 in accordance with embodiments described herein.

FIG. 2 is a block diagram of an ad serving system 200, which is an example implementation of ad serving system 106 shown in FIG. 1 in accordance with an embodiment described herein. Ad serving system 200 is configured to modify ad(s) based on an emotional state of a user (e.g., a user who operates one of user systems 102). Ad serving system 200 includes ad selector 202 and ad storage 204. Ad storage 204 stores ads, which may be modified by ad selector 202.

Ad selector 202 is an example implementation of ad selector 110 in FIG. 1 in accordance with an embodiment. As shown in FIG. 2, ad selector 202 includes a selection module 206, a modification module 208, and a determination module 210. Determination module 210 and modification module 208 are communicatively coupled to a user system 102 that is owned by or otherwise accessible to the user via a direct network connection or via intermediate component(s) such as one or more of publisher systems 104A-104N as discussed above with reference to FIG. 1.

Selection module 206 is configured to analyze ads that are stored in ad storage 204. Selection module 206 is further configured to select ad(s) 212 from among the ads that are stored in ad storage 204 based on the analysis of those ads for provision to the user.

Determination module 210 is configured to determine the emotional state of the user based on current and/or past online activity of the user. Determination module 210 is further configured to provide emotion indicator 214, which specifies the emotional state of the user, to modification module 208.

Modification module 208 is configured to modify the selected ad(s) 212 based on the emotional state of the user, as specified by emotion indicator 214, to provide respective modified ad(s) 216 to the user system 102 of the user. For instance, modification module 208 may provide the modified ad(s) to the user system 102 via one or more of publisher systems 104A in a manner that will be apparent to ordinarily skilled artisans having the benefit of this disclosure, without requiring further explanation.

It will be recognized that ad serving system 200 may not include one or more of ad storage 204, selection module 206, modification module 208, and/or determination module 210. Furthermore, ad serving system 200 may include modules in addition to or in lieu of ad storage 204, selection module 206, modification module 208, and/or determination module 210.

Figure 3:
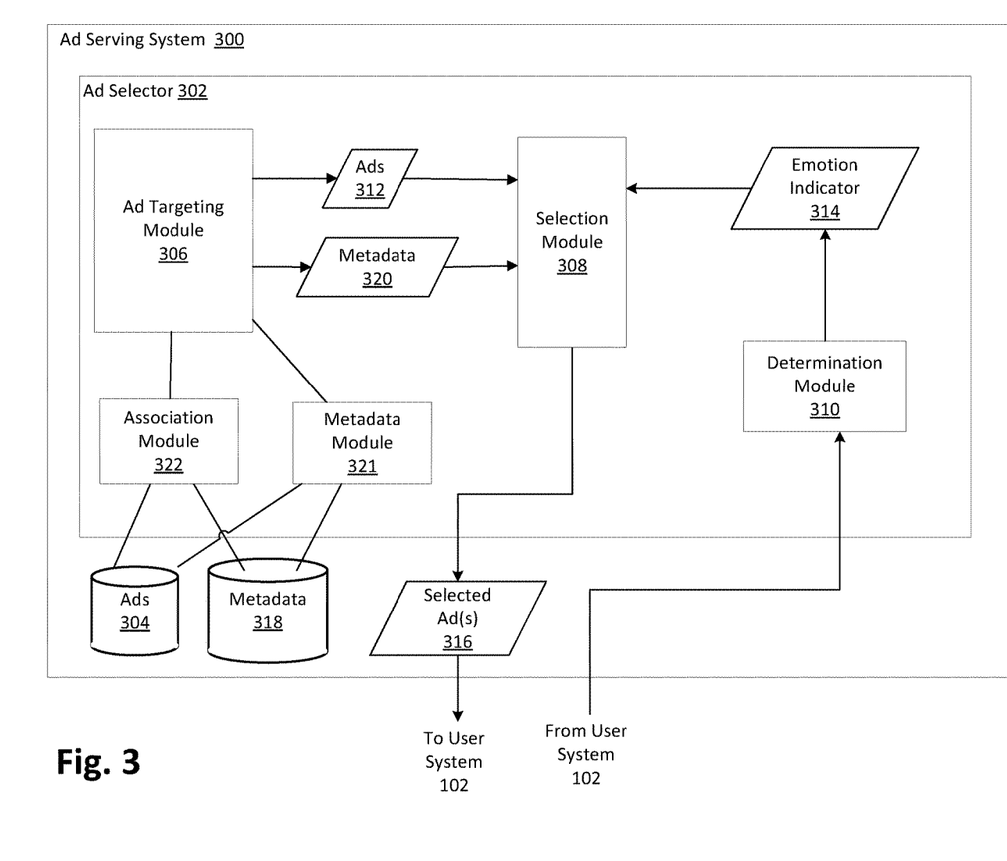

FIG. 3 is a block diagram of an ad serving system 300, which is another example implementation of ad serving system 106 shown in FIG. 1, in accordance with an embodiment described herein. Ad serving system 300 is configured to select ad(s) based on an emotional state of a user. Ad serving system 300 includes ad selector 302, ad storage 304, and metadata storage 318. Ad storage 304 stores ads, which may be selected for provision to the user. Metadata storage 318 stores metadata. Ad storage 304 and metadata storage 318 may be combined or separate, though they are illustrated separately in FIG. 3 merely for ease of discussion.

Ad selector 302 is another example implementation of ad selector 110 in FIG. 1 in accordance with an embodiment. As shown in FIG. 3, ad selector 302 includes an ad targeting module 306, a selection module 308, a determination module 310, a metadata module 321, and an association module 322. Each of association module 322 and metadata module 321 is coupled between ad targeting module 306 and ad storage 304 and between ad targeting module 306 and metadata storage 318. Determination module 310 and selection module 308 are communicatively coupled to a user system 102 that is owned by or otherwise accessible to the user via a direct network connection or via intermediate component(s) such as one or more of publisher systems 104A-104N as discussed above with reference to FIG. 1. Selection module 308 is communicatively coupled between ad targeting module 306 and determination module 310.

Ad targeting module 306 is configured to evaluate ads that are stored in ad storage 304. Ad targeting module 306 is further configured to determine ads 312, which is a subset of the ads that are stored in ad storage 304, based on the evaluation. An example technique for determining ads 312 is discussed in greater detail below. Ad targeting module 206 also provides instances of metadata 320, which are associated with the respective ads 312.

Association module 322 associates the ads that are stored in ad storage 304 with respective instances of metadata that are stored in metadata storage 318. Each instance of the metadata provides information about the respective ads including one or more specified emotional states, as described in greater detail below. In one example, the metadata that is stored in metadata storage 318 is generated by metadata module 321. It will be recognized that ad selector 302 need not necessarily include metadata module 321. For example, metadata module 321 may be external to ad selector 302 or even external to ad serving system 300. In another example, metadata module 321 is omitted entirely, and metadata 318 is manually prepared or received from an outside source, such as advertiser system 108. The content, use, and operation of the metadata is described in detail below with reference to FIGS. 4-5.

As discussed in greater detail below, ad targeting module 306 may be configured to apply its own targeting routine to ads 304 to yield ads 312. Selection module 308 may then perform a further round of selection upon ads 312 to provide selected ad(s) 316. For instance, selection module 308 is capable of providing an output that includes a subset of ads 312 that, according to metadata 320, correspond to an emotional state that most closely matches the user's emotional state, which is specified by emotion indicator 314. The subset of ads 312 is labeled as "Selected Ad(s) 316 in FIG. 3. Selected ad(s) 316 are transmitted to the user system 102 that is owned by or otherwise accessible to the user in a manner that will be apparent to ordinarily skilled artisans having the benefit of this disclosure, without requiring further explanation.

It will be recognized that ad serving system 300 may not include one or more of ad targeting module 306, selection module 308, determination module 310, association module 322, metadata module 321, ad storage 304, and/or metadata storage 318. Furthermore, ad serving system 300 may include modules in addition to or in lieu of ad targeting module 306, selection module 308, determination module 310, association module 322, metadata module 321, ad storage 304, and/or metadata storage 318.

Figure 4:
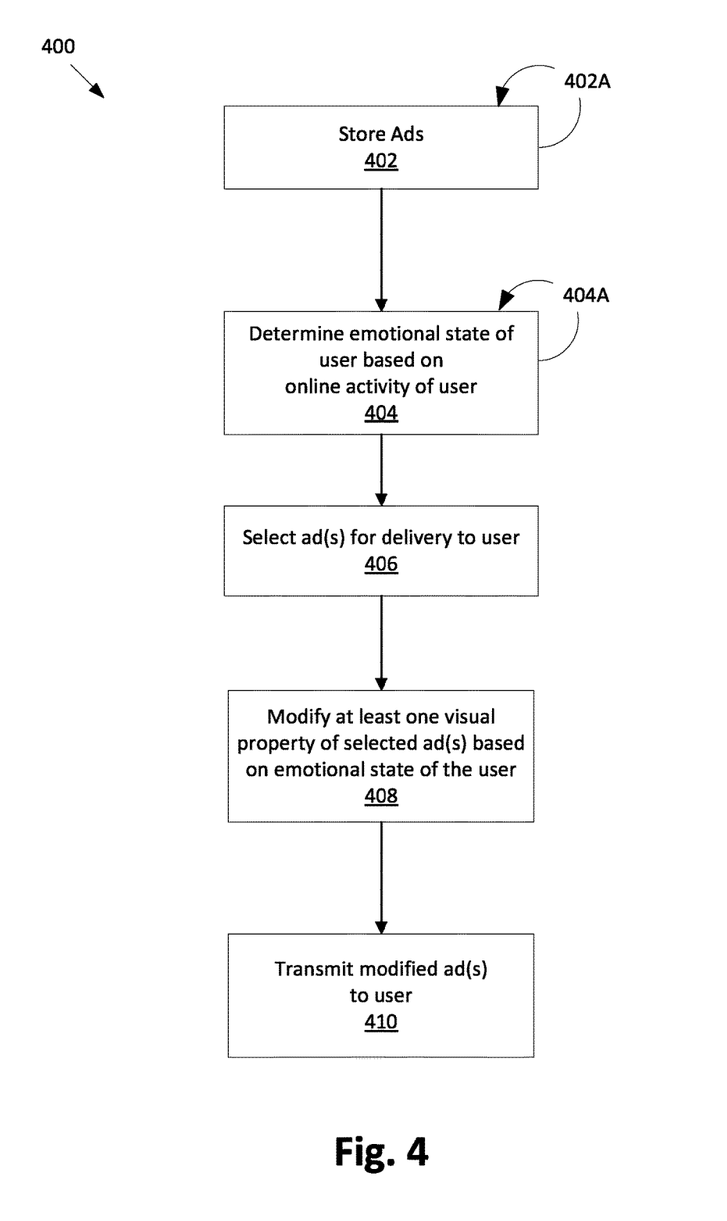
FIG. 4 depicts a flowchart of an example method for modifying ad(s) based on an emotional state of a user in accordance with an embodiment described herein.
Figure 5:
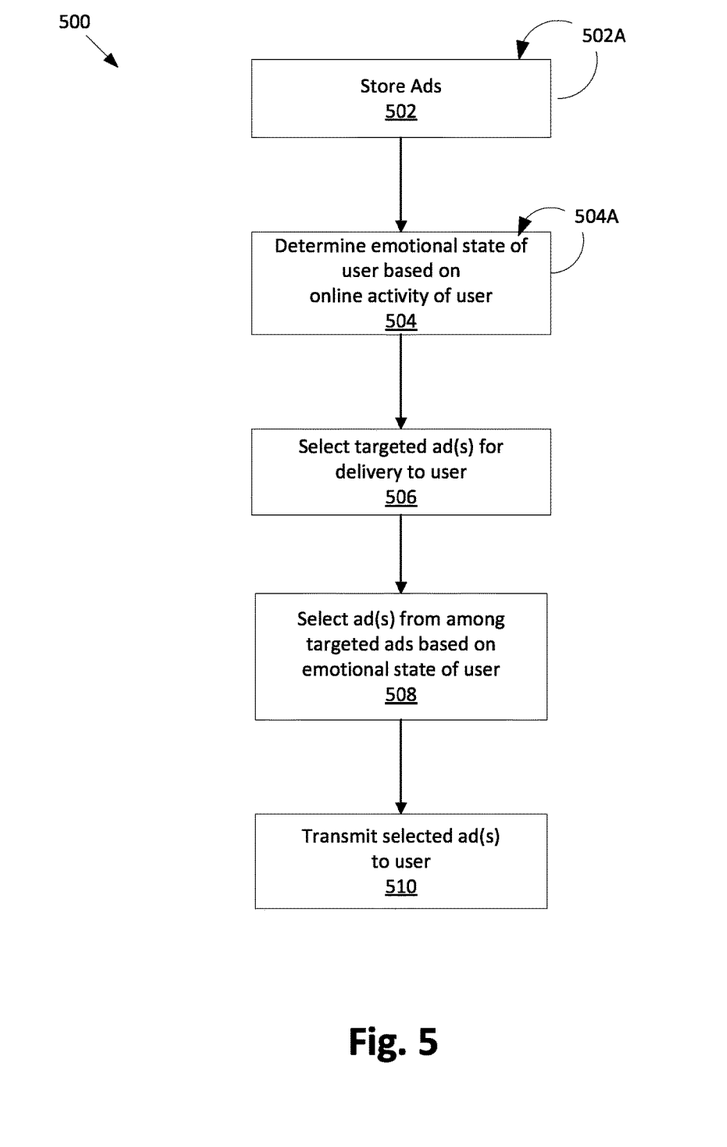
FIG. 5 depicts a flowchart of an example method for selecting ad(s) based on an emotional state of a user in accordance with an embodiment described herein.

Having described various structural features, some operational aspects are now described. FIG. 4 depicts a flowchart 400 of an example method for modifying ad(s) based on an emotional state of a user in accordance with an embodiment described herein. FIG. 5 depicts a flowchart 500 of an example method for selecting ad(s) based on an emotional state of a user in accordance with an embodiment described herein. Flowcharts 400 and 500 are described with continued reference to the systems 100, 200, and 300 depicted in respective FIGS. 1-3 for purposes of illustration and are not limited to such implementation(s). Further structural and operational embodiments will be apparent to persons skilled in the relevant art(s) based on the discussion regarding flowcharts 400 and 500.

For purposes of explanation, the following discussions reference operations performed by specific components such as 200, 202, 206, 208, 210, 300, 302, 306, 308, 310, 322, and/or 321. These descriptions are only made by way of example, however, and no limitation is intended. For example, instead of the roles described below, there may be one or more separate components outside the ad serving system 106 to perform one or more of the tasks of selecting ad(s), modifying ad(s), and/or detecting an emotional state of a user. Furthermore, multiple tasks may be consolidated into described components, without departing from this disclosure.

As shown in FIG. 4, the method of flowchart 400 begins at step 402. In step 402, ad storage 204 stores various ads for delivery to user computers 102. These ads may be received from advertisers via computers such as advertiser system 108, received via a management console coupled to ad serving system 106, or received from another local or remote source. In an example, the ads may be stored in ad storage 204.

Each of the received ads includes some visual aspect, and may include text, graphics, static images, animation, video, multimedia content, etc. or any combination thereof.

Although each of the ads includes a visual aspect, the ads are not limited to visual aspects. The ads also may include non-display aspects, such as sound. Therefore, any references to the term "display ad" are used for convenience, and not with any intended limitation, and such references are understood to include any means for presenting advertising to a network connected user system 102 including visual aspects and optionally or other aspects such as sound.

In an example embodiment, the ads are configured to be viewable using web browsers that are executed by the user systems 102. To present multimedia content, the user systems 102 may use "plug-in" software modules in order to present the animation and/or multimedia content. Such plug-in software modules may include for example a Java™ plug-in made available by Sun Microsystems™ of Santa Clara, Calif., an Adobe® Flash® or Shockwave® plug-in made available by Adobe Systems Inc. of San Jose, Calif., or a Microsoft® Silverlight™ plug-in made available by Microsoft Corporation of Redmond, Wash. In accordance with this example embodiment, the ads may include one or more interactive elements such as hyperlinks.

Regardless of the remainder of flowchart 400, the operations of receiving and storing ads as described with reference to step 402 may be ongoing, as shown by arrow 402a.

In the present example, determination module 210 initiates step 404 whenever circumstances arise for delivery of an ad to a given user. For example, step 404 may be performed in response to determination module 210 receiving a user request for new online content from a user system 102. The request may be received directly from user system 102 or forwarded via a publisher 104. Examples of actions that may trigger a request for online content include, but are not limited to, the user navigating to a new Web site or Web page, the user activating a hyperlink, the user beginning an online game, etc.

In another example, step 404 may additionally occur responsive to an event unrelated to user activity, such as where ad serving system 200 or a publisher 104 automatically delivers new ads in response to the passage of time, for example, irrespective of user requests for content. Ordinarily skilled artisans, having the benefit of this disclosure, may recognize further mechanisms for scheduling or triggering the delivery of online advertising to users in a manner that is appropriate to this disclosure.

At any rate, when determination module 210 initiates step 404, this is done with regard to the given user to whom an ad is intended to be delivered. This user will be referred to as a "current" user.

At step 404, determination module 210 determines the emotional state of the current user based on the current user's online activity. Examples of online activity include, but are not limited to, consumption of online content such as blog text, an online video, online music, etc. by the user; entry of information such as text (e.g., keywords), an emoticon, an image, a video, etc. by the user in an email message, a social networking update, a blog post, a Web page, a cloud application (e.g., an online calendar), etc.; and any other suitable type of online activity, whether current or historical.

For example, determination module 210 may receive information regarding the online activity of the user from any one or more of the publishers 104 (e.g., from a record of the user's accumulated web browsing history) or from any other source without limitation. The online activity may be current, in that it is occurring at substantially the same time that step 404 is performed, or it may occur within a designated time period prior to a time at which step 404 is performed.

In some example embodiments, determination module 210 performs an emotion-mining operation with respect to the online activity to determine the emotional state of the user. Some exemplary emotion-mining techniques are discussed in the following papers: (1) Yuchul Jung, Hogun Park et al., *A Hybrid Mood Classification Approach for Blog Text*, Lecture Notes in Artificial Intelligence, Proceedings of the 9$^{th}$ Pacific Rim International Conference on Artificial Intelligence, pp. 1099-1103, 2006, (2) M. K. Petersen and A. Butkus, *Extracting Moods from Songs and BBC Programs Based on Emotional Context*, International Journal of Digital Multimedia Broadcasting, Volume 2008 (2008), Article ID 2899837, 2008, and (3) Mihalcea and Liu, *A Corpus-based Approach to Finding Happiness*, AAAI 2006 Symposium on Computational Approaches to Analysing Weblogs, 2006. The entirety of each of the foregoing documents is hereby incorporated by reference in its entirety into this disclosure.

In accordance with these example embodiments, after performing the emotion-mining operation, determination module 210 places the determined emotional state into one or more of several predetermined categories. The categorized emotional state(s) are specified by emotional indicator 314. For purposes of illustration, assume that emotional indicator 314 specifies four categorized emotional states, namely: Happy, Sad/Bored/Tired, Excited, and Frustrated, though the scope of the example embodiments is not limited in this respect. It will be recognized that emotional indicator 314 may specify any suitable categorized emotional states. Moreover, it will be recognized that emotional indicator 314 may specify a greater or lesser number of categorized emotional states. Furthermore, in other example embodiments, the step of categorizing the determined emotional state may be omitted entirely.

In one example implementation of step 404, determination module 210 detects that the user is currently playing online music content including a track entitled "Natural High" by Pacific, in response to which determination module 210 may conclude that the user's emotional state is Happy. In another example implementation of step 404, determination module 210 detects that the user recently played an online music track entitled "For Whom the Bell Tolls" by Metallica, in response to which determination module 210 may conclude that the user's emotional state is Frustrated.

Regardless of the remainder of method 400, the operations of detecting emotional state in step 404 may be ongoing, as shown by arrow 404a.

At step 406, selection module 206 selects ad(s) 212 for delivery to the current user. For example, step 406 may be performed in response to any of the events that may trigger step 404 as explained above, though the scope of the example embodiments is not limited in this respect.

It will be recognized that ad(s) 212 may be selected using any of a variety of approaches. For instance, ad(s) 212 may be selected utilizing user-agnostic approaches such as targeting ads based on the current time, based on requested online content, based on a predetermined schedule or availability of ads from different advertising campaigns, based on world events, based on an ongoing sale or special deal, etc. or any combination thereof without limitation. In addition or alternatively, ad(s) 212 may be selected using user-based approaches for targeting ads, one example of which employs a behavioral targeting technique. For instance, the behavioral targeting technique may use information collected regarding the current user's Web browsing behavior or other online activity, such as the pages the user has visited and/or the searches the user has made, to select ad(s) 212 for delivery to the user. Other examples of information that may be used by user-based approaches include geographical information that is associated with the user (e.g., where the user lives, works, or is presently located), demographic information regarding the user, the nature of the online content that is requested by the user, history of purchase transactions and/or searches that the user has made, etc. without limitation. Many suitable techniques for targeting online ads will be apparent to artisans of ordinary skill having the benefit of this disclosure.

In one embodiment, steps 404 and 406 are independent of each other. Although shown after step 404, step 406 may be performed concurrently with step 406 or even prior to step 404. In another embodiment, ad targeting as described above with reference to step 406 is carried out in a manner that depends upon the emotional state of the user. For instance, selection module 206 may consider the current user's emotional state in a strategy for targeting ads to the current user.

In step 408, modification module 208 modifies at least one visual property of ad(s) 212, which were selected at step 406, based on the current user's emotional state, which is specified by indicator 214.

In some example embodiments, modifications to the ad(s) 212 are directed at color. For instance, colors may have an impact on people's emotions and feelings. In one example, the color red may be associated with excitement, orange may be perceived as distressing and upsetting, purple as dignified and stately, yellow as cheerful, and blue may be associated with comfort and security. See, e.g., L. Norton, *What Color Is Your Mood*, Journal of Applied Psychology, 2006, which is incorporated herein by reference in its entirety. In another example, a person may associate light colors such as yellow and blue with positive emotions such as happiness. In accordance with this example, the person may associate dark colors such as black and gray with negative emotions such as sadness and anger. See, e.g., Boyatzis et al., *Children's Emotional Association with Colours*, Journal of Genetic Psychology, v. 155(1), pp. 77-85, 1994, which is incorporated herein by reference in its entirety. In yet another example, a person with depression or anxiety may associate his or her mood with the color gray, while a happy person may prefer yellow.

In still another example, red may be considered a "warm" color because the dominant wavelength may produce strain on the eye. In accordance with this example, a significantly big red background creative in an ad may disturb the user, which may cause the user to move out of a web page with which the ad is associated. Thus, to achieve longer periods of user engagement, ads may advantageously be modified to exhibit a color of harmony. For instance, relatively cooler colors such as blue, green, and purple may be considered to be restful and quiet, while relatively warmer colors such as red, yellow, and orange may be considered active and stimulating. The example color associations mentioned herein are provided for illustrative purposes and are not intended to be limiting. It will be recognized that the example embodiments may employ any suitable color associations.

In an example embodiment, modification module 208 modifies ad(s) 212 by changing hue, brightness, contrast, saturation, and/or other color-related attributes. See, e.g., Carruthers et al., *The Manchester Color Wheel: Development of a Novel Way of Identifying Color Choice and its Validation in Healthy, Anxious and Depressed Individuals*, BMC Medical Research Methodology 2010, 10:12, Feb. 9, 2010, which is incorporated herein by reference in its entirety. For instance, modifying hue may be achieved by applying a color filter, by de-saturating an image and then substituting a different color, by performing a color-replacement operation, or another suitable operation.

Hue, brightness, contrast, saturation, and/or other color related attributes of ad(s) 212 may be changed using a commercially available or custom developed image editing program. Some examples of a commercially available image editing program include, but are not limited to, Adobe® Photoshop®, Adobe® Elements®, Picasa™, GIMP, Faststone™, and Piknik™. In contrast with these commercially available programs, modification module 208 may incorporate appropriate executable code to perform the desired types of color modifications.

In accordance with some example embodiments, modification module 208 performs predetermined types of modifications for the respective categories of emotional states as discussed above. For example, if emotional indicator 214 specifies a Happy emotional state, modification module 208 may apply or amplify a yellow or green hue in ad(s) 212 to provide modified ad(s) 216. In accordance with this example, modification module 208 may additionally or alternatively increase contrast and/or brightness of ad(s) 212. In another example, if emotional indicator 214 specifies a Sad/Bored/Tired emotional state, modification module 208 may apply or amplify a red hue in ad(s) 212, de-saturate existing colors in ad(s) 212, and/or decrease contrast and/or brightness in ad(s) 212 to provide modified ad(s) 216.

In yet another example, if emotional indicator 214 specifies an Excited emotional state, modification module 208 may apply or amplify a yellow or red hue in ad(s) 212 to provide modified ad(s) 216. In accordance with this example, modification module 208 may additionally or alternatively increase contrast and/or brightness of ad(s) 212. In still another example, if emotional indicator 214 specifies a Frustrated emotional state, modification module 208 may apply or amplify a blue hue in ad(s) 212 and/or decreases brightness and contrast in ad(s) 212. It will be recognized that other mappings may be used, with any of a variety of different combinations of hue, brightness, contrast, saturation, and/or any other visual quality or combination thereof that is suitable for the purposes discussed herein. Furthermore, instead of (or in addition to) emphasizing a color-based feature of the ad(s) 212, modification module 208 may de-emphasize a color-based feature associated with an emotional state that is counter to the emotional state specifies by emotion indicator 214.

In an example embodiment, at step 408, one or more non-color-based features of ad(s) may be selected or changed in addition to or in lieu of changing the one or more color-based features. For instance, a background music track may be selected or changed for delivery in conjunction with the ad 212, based on the user's emotional state.

At step 410, modification module 208 transmits modified ad(s) 216 to the user. For instance, modification module 208 may transmit the modified ad(s) to user system 102 of the user directly or via a publisher 104. For example, modified ad(s) 216 may include any suitable type of ads, including but not limited to banner ad(s), pop-up ad(s), etc. to be displayed in combination with online content that is delivered to the user.

In some example embodiments, one or more steps 402, 404, 406, 408, and/or 410 of flowchart 400 may not be performed. Moreover, steps in addition to or in lieu of steps 402, 404, 406, 408, and/or 410 may be performed.

As shown in FIG. 5, the method of flowchart 500 begins at step 502. In step 502, ad storage 304 stores ads for delivery to user computers 102. These ads may be received from advertisers via computers such as 108, received via a management console (not shown), or received from another local or remote source. In an example, the ads may be stored in ad storage 304.

The received ads are ads of the same nature as described above in the context of step 402. Regardless of the remainder of flowchart 500, the operations of receiving and storing ads as described with reference to step 502 may be ongoing, as shown by arrow 502a.

In accordance with some example embodiments, step 502 may include generating metadata corresponding to one or more of the ads that are stored in ad storage 304. For instance, the metadata may be generated upon receipt of the ads or at a later time. The metadata is stored in metadata storage 318.

To generate metadata, metadata module 321 analyzes one or more of the ads to determine likely emotional effect(s) thereof on a user. Metadata module 321 generates one or more metadata records to indicate the determined emotional effect(s). For example, the metadata may include one metadata record for each of the ads, or one metadata record may pertain to multiple ads. In another example, metadata for one or more of the ads is integrated into the relevant ads, in which case separate storage (i.e., metadata storage 318) for storing the metadata may be omitted.

Metadata module 321 may perform its analysis of the ads that are stored in ad storage 304 by analyzing one or more predetermined visual features of the ads, such as brightness, contrast, hue, use of animation, presence or absence of designated words, use of designated fonts, number of different colors, or any other feature that may be related to emotional effect of an ad. In some example embodiments, when ads are received at step 502, alone or more of the ads are accompanied by metadata prepared in advance by an advertiser to specify the intended emotional effect of the ads. In such embodiments, module 321 may be omitted.

As another optional feature of step 502, association module 322 may associate each of the ads that are stored in ad storage 304 with corresponding metadata that is stored in metadata storage 318. For example, module 322 may create links, references, pointers, or other associations between the ads and their corresponding metadata. Such associations may be stored in any suitable storage, such as ad storage 304 and/or metadata storage 318. In another example, a link from an ad to the corresponding metadata, or vice versa, may be created when the metadata is created by metadata module 321. In accordance with this example, association module 322 may be omitted.

In still another example, where there are links or other data structures that explicitly associate the ads and the metadata, the function of association module 322 is to retrieve the ads and to find the associated metadata on behalf of ad targeting module 306, as explained in greater detail below.

In the illustrated example, determination module 310 initiates step 504 whenever circumstances arise for delivery of an ad to a given user. Numerous examples of these circumstances were described above in conjunction with step 404. Accordingly, when determination module 310 initiates step 504, this is done with regard to the given user to whom the ad is intended to be delivered. This user will be referred to as a "current" user.

At step 504, determination module 310 determines the emotional state of the current user based on the current user's online activity. This operation may be conducted using any of the exemplary operations described above with reference to step 404. In the present example, determination module 310 may determine the emotional state of the user based on online activity by applying emotion-mining techniques to the online activity. Also, after applying the emotion-mining techniques, determination module 310 may place the determined emotional state into one or more predetermined categories, which may be specified by emotion indicator 314. For purposes of illustration, assume that there are four categories, namely: Happy, Sad/Bored/Tired, Excited, and Frustrated. However, a greater or lesser number of categories may be used, as suits the details of the particular application. Furthermore, the step of categorizing the determined emotional state may be omitted entirely.

Regardless of the remainder of method 500, the operations of determining the emotional state at step 504 may be ongoing, as shown by arrow 504a.

In accordance with an example embodiment, the choice of advertising for the current user at a particular time is left until the user is engaged in receiving online content, so that the system 100 can specifically target ads to the requesting user. Such an occurrence may trigger step 506. In one example, step 506 may be performed in response to any one or more of the circumstances or events discussed above in conjunction with step 406.

At step 506, ad targeting module 306 selects targeted ad(s) for delivery to the current user. For instance, ad targeting module 306 may select a group of multiple targeted ads 312 from the ads that are stored in storage 304 312 for possible delivery to the current user. The targeted ad(s) also may be referred to as "candidate ad(s)" because the group may be further refined by selection module 308 as explained below.

Targeted ads 312 may be selected in any of a variety of ways. In one example, an ad campaign may be in progress relating to products and services from a specified vendor, such as Nike® shoes. Relatedly, ad storage 304 may contain a group of ten Nike® ads for this campaign. At step 506, ad targeting module 306 may determine that ads from the Nike® campaign are to be delivered to the current user. In accordance with this example, ad targeting module 306 may include the Nike® ads in ads 312 and metadata that is associated with the Nike® ads in metadata 320.

In an example embodiment, ad targeting module 306 may apply one or more of the targeting techniques discussed above with reference to step 406, such as any of the user-agnostic or user-based targeting techniques discussed above, or any combination thereof. For instance, ads 312 may include a specified number (e.g., 5, 20, etc.) of ads and/or ads that satisfy a designated relevance threshold regarding the current user.

In one example, responsive to a request from ad targeting module 306 for a specific one or more ads, association module 322 retrieves the requested ads from ad storage 304 and the associated metadata that is stored in metadata storage 318. In one example, module 322 employs the previously described link, reference, pointer, or other association between each ad and its metadata in order to associate the two, and thereafter relays the associated items from respective storages 304 and 318 to ad targeting module 306.

In one embodiment, steps 504 and 506 are independent of each other. Although step 506 is shown to follow step 504 for illustrative purposes, it will be recognized that step 506 may be performed concurrently with step 504 or even prior to step 504. In a different embodiment, ad targeting in step 506 is carried out in a manner that depends upon the emotional state of the user. Namely, ad targeting module 306 may take the emotional state of the user into consideration when targeting ads to the current user.

In step 508, module 308 selects one or more ads 316 from among the targeted ads 312 based on the emotional state of the user, which is specified by emotion indicator 314, for delivery to the current user. In one example, ad(s) 316 are selected by comparing the emotional state from step 504 with metadata 320 that is associated with ads 312. For instance, selection module 308 may select the ad(s) 316, which most closely correspond to the user's emotional state. For instance, if emotion indicator 314 specifies that the user's emotional state is Happy, and metadata 320 for a particular ad indicates that the ad corresponds to a Happy emotional state, then selection module 308 may select that ad. Ties between equally appropriate ads may be resolved by random selection, by consulting ad targeting module 306 for additional ad targeting input, by rotating or shuffling among ads 312, or another approach suitable for the purposes of this disclosure.

In an example embodiment, instead of using metadata 320, selection module 308 may analyze each of the ads 312 to determine the likely emotional effect thereof and bins the ads 312 into the predetermined categories discussed above. Selection module may then select one or more of the ads 312 that best match the user's emotional state, which is specified by emotion indicator 314, to be provided as selected ad(s) 316. In accordance with this embodiment, metadata 318, metadata module 321, and association module 322 may be omitted.

At step 510, selection module 308 transmits the selected ad(s) 316 to the user. For instance, selection module 308 may transmit the selected ad(s) 316 to user system 102 of the user directly or via a publisher 104. For example, the selected ad(s) 316 may include any suitable type of ads, including but not limited to banner ad(s), pop-up ad(s), etc. to be displayed in combination with online content that is delivered to the user.

In some example embodiments, one or more steps 502, 504, 506, 508, and/or 510 of flowchart 500 may not be performed. Moreover, steps in addition to or in lieu of steps 502, 504, 506, 508, and/or 510 may be performed.

It will be recognized that various steps of flowcharts 400 and 500 may be combined. For example, one or more steps of flowchart 500 may be performed to select a targeted ad from a given campaign or other group, and then step 408 of flowchart 400 may be performed in order to modify visual appearance of the selected ad. This example may be carried out using system 300, but with the addition of modification module 208. For instance, modification module 208 may be implemented downstream of ad targeting module 306 in order to reduce workload of modification module 208, though the scope of the example embodiments is not limited in this respect.

Furthermore, although the method of flowchart 400 is illustrated as being performed downstream from selection module 206 for ease of discussion, the method of flowchart 400 may be performed by selection module 206. Similarly, although the method of flowchart 500 is illustrated as being performed downstream from ad targeting module 306 for ease of discussion, the method of flowchart 500 may be performed by ad targeting module 306.

Moreover, instead of producing a group of targeted ads 312 as described with reference to FIG. 3, ad targeting module 306 may additionally perform the functions of selection module 308, to produce the selected ad(s) 316. In the foregoing example, ad targeting module 306 may be communicatively coupled to determination module 310, with selection module 308 being omitted.

Similarly, instead of using the modification module 208 to produce modified ad(s) 216 as shown in FIG. 2, selection module 206 may additionally perform the functions of modification module 208, to produce the modified ad(s) 216. In the foregoing example, selection module 206 may be communicatively coupled to determination module 210, with modification module 208 being omitted.

III. Other Example Embodiments

Ad selector 110, selection module 206, modification module 208, determination module 210, ad targeting module 306, association module 322, metadata module 321, selection module 308, and determination module 310 may be implemented in hardware, software, firmware, or any combination thereof.

For example, ad selector 110, selection module 206, modification module 208, determination module 210, ad targeting module 306, association module 322, metadata module 321, selection module 308, and/or determination module 310 may be implemented as computer program code configured to be executed in one or more processors.

In another example, ad selector 110, selection module 206, modification module 208, determination module 210, ad targeting module 306, association module 322, metadata module 321, selection module 308, and/or determination module 310 may be implemented as hardware logic/electrical circuitry.

IV. Example Computer Implementation

Figure 6:
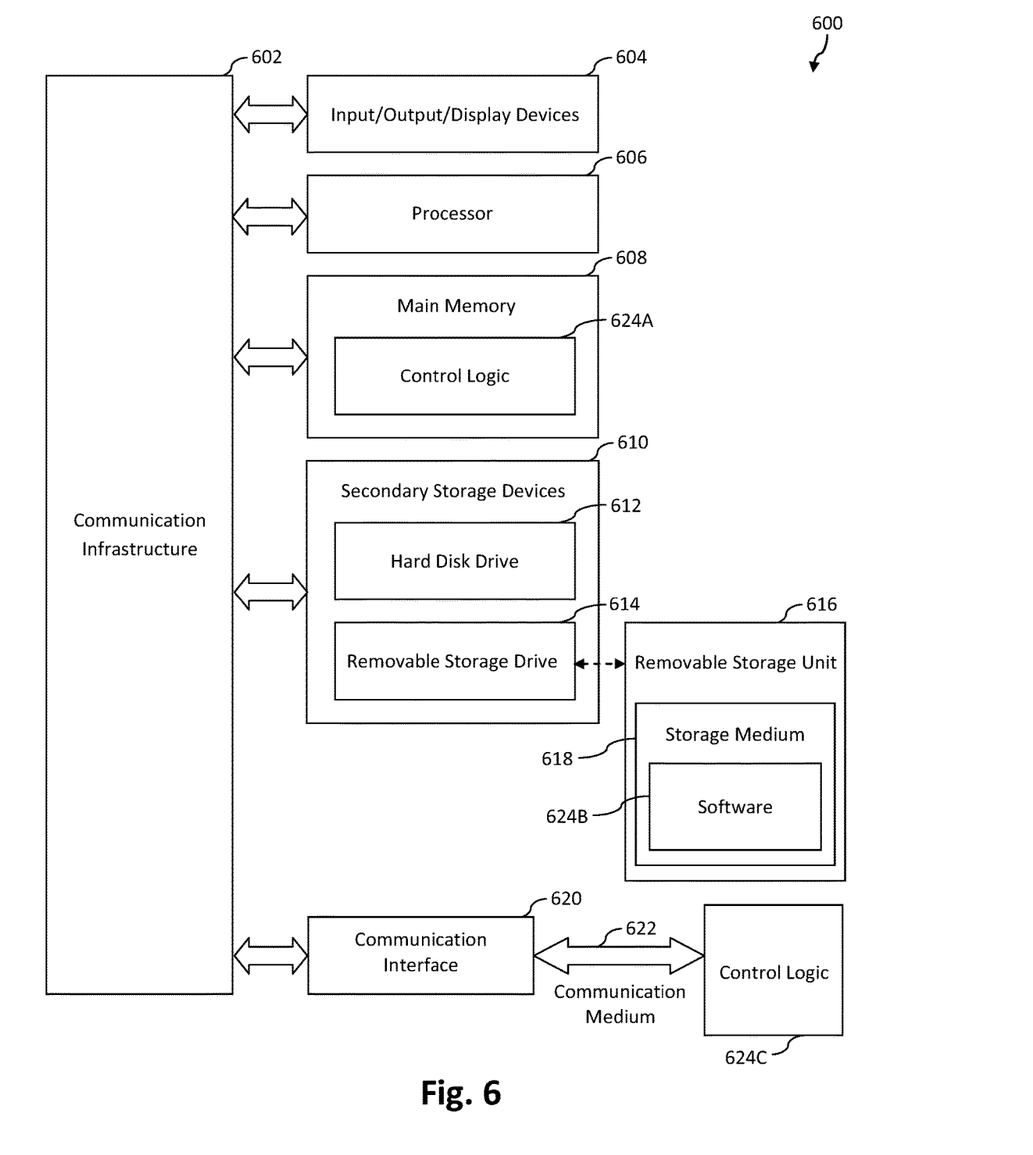
FIG. 6 is a block diagram of an example computer in which embodiments may be implemented.

The embodiments described herein, including systems, methods/processes, and/or apparatuses, may be implemented using well known servers/computers, such as computer 600 shown in FIG. 6. For instance, elements of example ad network 100, including any of the user systems 102A-102M, any of the publisher servers 104A-104N, advertiser system 108, and ad serving system 106 depicted in FIG. 1 and elements thereof, each of the steps of flowchart 400 depicted in FIG. 4, and each of the steps of flowchart 500 depicted in FIG. 5 can each be implemented using one or more computers 600.

Computer 600 can be any commercially available and well known computer capable of performing the functions described herein, such as computers available from International Business Machines, Apple, Sun, HP, Dell, Cray, etc. Computer 600 may be any type of computer, including a desktop computer, a server, etc.

As shown in FIG. 6, computer 600 includes one or more processors (e.g., central processing units (CPUs)), such as processor 606. Processor 606 may include ad selector 110 and/or search engine module 112 of FIG. 1; selection module 206, modification module 208, and/or determination module 210 of FIG. 2; ad targeting module 306, association module 322, metadata module 321, selection module 308, and/or determination module 310 of FIG. 3, or any portion or combination thereof, for example, though the scope of the embodiments is not limited in this respect. Processor 606 is connected to a communication infrastructure 602, such as a communication bus. In some embodiments, processor 606 can simultaneously operate multiple computing threads.

Computer 600 also includes a primary or main memory 608, such as a random access memory (RAM). Main memory has stored therein control logic 624A (computer software), and data.

Computer 600 also includes one or more secondary storage devices 610. Secondary storage devices 610 include, for example, a hard disk drive 612 and/or a removable storage device or drive 614, as well as other types of storage devices, such as memory cards and memory sticks. For instance, computer 600 may include an industry standard interface, such as a universal serial bus (USB) interface for interfacing with devices such as a memory stick. Removable storage drive 614 represents a floppy disk drive, a magnetic tape drive, a compact disk drive, an optical storage device, tape backup, etc.

Removable storage drive 614 interacts with a removable storage unit 616. Removable storage unit 616 includes a computer useable or readable storage medium 618 having stored therein computer software 624B (control logic) and/or data. Removable storage unit 616 represents a floppy disk, magnetic tape, compact disc (CD), digital versatile disc (DVD), Blue-ray disc, optical storage disk, memory stick, memory card, or any other computer data storage device. Removable storage drive 614 reads from and/or writes to removable storage unit 616 in a well known manner.

Computer 600 also includes input/output/display devices 604, such as monitors, keyboards, pointing devices, etc.

Computer 600 further includes a communication or network interface 620. Communication interface 620 enables computer 600 to communicate with remote devices. For example, communication interface 620 allows computer 600 to communicate over communication networks or mediums 622 (representing a form of a computer useable or readable medium), such as local area networks (LANs), wide area networks (WANs), the Internet, etc. Network interface 620 may interface with remote sites or networks via wired or wireless connections. Examples of communication interface 622 include but are not limited to a modem, a network interface card (e.g., an Ethernet card), a communication port, a Personal Computer Memory Card International Association (PCMCIA) card, etc.

Control logic 624C may be transmitted to and from computer 600 via the communication medium 622.

Any apparatus or manufacture comprising a computer useable or readable medium having control logic (software) stored therein is referred to herein as a computer program product or program storage device. This includes, but is not limited to, computer 600, main memory 608, secondary storage devices 610, and removable storage unit 616. Such computer program products, having control logic stored therein that, when executed by one or more data processing devices, cause such data processing devices to operate as described herein, represent embodiments of the invention.

For example, each of the elements of example ad selector 110 and search engine module 112, each depicted in FIG. 1; selection module 206, modification module 208, and determination module 210, each depicted in FIG. 2; ad targeting module 306, association module 322, metadata module 321, selection module 308, and determination module 310, each depicted in FIG. 3; each of the steps of flowchart 400 depicted in FIG. 4; and each of the steps of flowchart 500 depicted in FIG. 5 can be implemented as control logic that may be stored on a computer useable medium or computer readable medium, which can be executed by one or more processors to operate as described herein.

V. Conclusion

While various embodiments have been described above, it should be understood that they have been presented by way of example only, and not limitation. It will be apparent to persons skilled in the relevant art(s) that various changes in form and details may be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A computer-implemented method for selecting online content based on an emotional state of a user, the method comprising:
   in a networked device of an online content serving system comprising at least one memory and at least one processor configured to execute instructions stored in the memory:
      obtaining, by the at least one processor, a plurality of portions of online content, wherein each portion of online content of the plurality of portions of online content is pre-associated with additional respective metadata that indicates one or more intended emotional states to which a party associated with the portion of online content intends the portion of online content to correspond;
      for each portion of online content of the plurality of portions of online content, automatically determining, by the at least one processor, a respective predicted emotional effect of the portion of online content on viewers by analyzing a respective predetermined visual feature of the portion of online content;
      automatically determining, by the at least one processor, an emotional state of a user based on an online activity of the user;
      for each portion of online content of the plurality of portions of online content, automatically associating, by the at least one processor, the portion of online content with additional respective metadata that indicates a determined respective predicted emotional effect on viewers of a portion of online content of the plurality of portions of online content;
      automatically selecting, by the at least one processor, in response to a request from a client device for requested content to display to the user, a target portion of online content from the plurality of portions of online content, based on the emotional state of the user and respective determined predicted emotional effect on viewers of a portion of online content of the plurality of portions of online content, including determining, by the at least one processor, that the additional respective metadata that is associated with the target portion of online content indicates an intended emotional state that is substantially same as the emotional state of the user;
      automatically modifying, by the at least one processor, at least one visual property of the selected target portion of online content based on the emotional state of the user; and
      automatically providing, by the at least one processor, the modified target portion of online content to the client device for display to the user with the requested content.

2. The computer-implemented method of claim 1, wherein the plurality of portions of online content corresponds to a plurality of respective specified emotional states; and
   wherein selecting the target portion of online content comprises:
      selecting, by the at least one processor, a first portion of online content of the plurality of portions of online content that corresponds to the emotional state of the user.

3. The computer-implemented method of claim 1, further comprising:
  determining, by the at least one processor, the plurality of portions of online content according to an online content targeting operation based on information regarding the user that is different from the emotional state of the user;
  wherein selecting the target portion of online content further comprises:
    selecting, by the at least one processor, the target portion of online content based on the information regarding the user that is different from the emotional state of the user.

4. The computer-implemented method of claim 1, wherein determining the emotional state of the user comprises:
  determining, by the at least one processor, the emotional state of the user based on consumed online content that is consumed by the user.

5. The computer-implemented method of claim 1, wherein determining the emotional state of the user comprises:
  determining, by the at least one processor, the emotional state of the user based on at least one of blog text, an online video, or online music that is consumed by the user.

6. A computer-implemented system comprising:
  at least one non-transitory computer-readable storage medium comprising a set of instructions for selecting a portion of online content based on an emotional state of a user; and
  at least one processor in communication with the computer-readable storage medium that is configured to execute the set of instructions stored in the computer-readable storage medium to:
    obtain a plurality of portions of online content, including for each portion of online content of the plurality of portions of online content, automatically associating the portion of online content with respective metadata that indicates the determined respective predicted emotional effect;
    for each portion of online content of the plurality of portions of online content, automatically determine a respective predicted emotional effect of the portion of online content on viewers by analyzing a respective predetermined visual feature of the portion of online content;
    automatically determine an emotional state of a user based on an online activity of the user;
    pre-associating each portion of online content of the plurality of portions of online content with additional respective metadata that indicates one or more intended emotional states to which a party associated with the portion of online content intends the portion of online content to correspond;
    automatically select, in response to a request from a client device for requested online content to display to the user, a target portion of online content from the plurality of portions of online content, based on the emotional state of the user and a respective determined predicted emotional effect on viewers of a portion of online content of the plurality of portions of online content, the at least one processor being configured to determine that the respective additional metadata that is associated with the target portion of online content indicates an intended emotional state that is substantially same as the emotional state of the user;
    automatically modify at least one visual property of the selected target portion of online content based on the emotional state of the user; and
    automatically provide the modified target portion of online content to the client device for display to the user with the requested online content.

7. The computer-implemented system of claim 6, wherein the plurality of portions of online content corresponds to a plurality of respective specified emotional states; and
  wherein to select the target portion of online content the at least one processor is configured to select a first portion of online content of the plurality of portions of online content that corresponds to the emotional state of the user.

8. The computer-implemented system of claim 6, wherein the at least one processor is further configured to determine the plurality of portions of online content according to an online content targeting operation based on information regarding the user that is different from the emotional state of the user;
  wherein to select the target portion of online content the at least one processor is configured to select the target portion of online content based on the information regarding the user that is different from the emotional state of the user.

9. The computer-implemented system of claim 6, wherein the at least one processor is configured to determine the emotional state of the user based on consumed online content that is consumed by the user.

10. The computer-implemented system of claim 6, wherein the at least one processor is configured to determine the emotional state of the user based on at least one of blog text, an online video, or online music that is consumed by the user.

11. A non-transitory computer-readable storage medium comprising computer program logic for enabling a processor-based system to select at least one portion of online content based on an emotional state of a user, the computer program logic configured to direct at least one processor to perform acts of:
  obtaining a plurality of portions of online content, including for each portion of online content of the plurality of portions of online content, automatically associating the portion of online content with respective metadata that indicates the determined respective predicted emotional effect;
  for each portion of online content of the plurality of portions of online content, automatically determining a respective predicted emotional effect of the portion of online content on viewers by analyzing a respective predetermined visual feature of the portion of online content;
  automatically determining an emotional state of a user based on an online activity of the user;
  pre-associating each portion of online content of the plurality of portions of online content with additional respective metadata that indicates one or more intended emotional states to which a party associated with the portion of online content intends the portion of online content to correspond;
  automatically selecting, in response to a request from a client device for requested online content to display to the user, a portion of online content from the plurality of portions of online content, based on the emotional state of the user and a respective determined predicted emotional effect on viewers of a portion of online content of the plurality of portions of online content, including determining that the respective additional metadata that is associated with the selected target portion of online content indicates an intended emotional state that is substantially same as the emotional state of the user;

automatically modifying at least one visual property of the selected target portion of online content based on the emotional state of the user; and automatically providing the modified target portion of online content to the client device for display to the user with the requested online content.

12. The computer-readable storage medium of claim 11, wherein the plurality of portions of online content corresponds to a plurality of respective specified emotional states; and wherein to select the target portion of online content, the computer program logic further directs the at least one processor to perform an act of:

selecting a first portion of online content of the plurality of portions of online content that corresponds to the emotional state of the user.

13. The computer-readable storage medium of claim 11, wherein the computer program logic further directs the at least one processor to perform acts of:

determining the plurality of portions of online content according to an online content targeting operation based on information regarding the user that is different from the emotional state of the user;

wherein to select the target portion of online content, the computer program logic further directs the at least one processor to perform an act of:

selecting the target portion of online content based on the information regarding the user that is different from the emotional state of the user.

14. The computer-readable storage medium of claim 11, wherein to determine the emotional state of the user, the computer program logic further directs the at least one processor to perform an act of:

determining the emotional state of the user based on consumed online content that is consumed by the user.

* * * * *